United States Patent
Sanchez García Viedma

(10) Patent No.: US 11,304,207 B2
(45) Date of Patent: Apr. 12, 2022

(54) SATELLITE AUTO ALIGNMENT AND COMMISSIONING METHOD FOR AUTOMATED ANTENNA TERMINALS

(71) Applicant: Integrasys LLC, Herndon, VA (US)

(72) Inventor: Alvaro Sanchez García Viedma, Herndon, VA (US)

(73) Assignee: Integrasys LLC, Herndon, VA (US)

( * ) Notice: Subject to any disclaimer, the term of this patent is extended or adjusted under 35 U.S.C. 154(b) by 0 days.

(21) Appl. No.: 17/116,124

(22) Filed: Dec. 9, 2020

(65) Prior Publication Data

US 2021/0282152 A1 Sep. 9, 2021

Related U.S. Application Data

(60) Provisional application No. 62/986,139, filed on Mar. 6, 2020.

(51) Int. Cl.
| | |
|---|---|
| *H04W 72/04* | (2009.01) |
| *H04W 72/08* | (2009.01) |
| *H04B 7/185* | (2006.01) |
| *H04W 72/00* | (2009.01) |

(52) U.S. Cl.
CPC ...... *H04W 72/082* (2013.01); *H04B 7/18523* (2013.01); *H04W 72/005* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2003/0050015 A1* | 3/2003 | Kelly | H04B 17/12 455/67.14 |
| 2006/0045038 A1* | 3/2006 | Kay | H04B 7/18523 370/316 |
| 2016/0191145 A1* | 6/2016 | Fang | H04B 7/18513 370/316 |
| 2017/0314892 A1* | 11/2017 | Holder | F41G 7/303 |
| 2017/0370678 A1* | 12/2017 | Holder | F41G 7/306 |
| 2020/0036435 A1* | 1/2020 | Ravishankar | H04B 7/18519 |

* cited by examiner

Primary Examiner — Kodzovi Acolatse
(74) Attorney, Agent, or Firm — The Webb Law Firm

(57) ABSTRACT

A Satellite Auto Alignment and Commissioning System and Method for Automated Antenna terminals (ATT) is disclosed. The method includes receiving Multicast information at a satellite modem from a server, sending the Multicast information to an API, transmitting a Clean carrier Wave (CW) from the satellite modem to the server in a frequency fixed by the Multicast information having a power at the satellite modem, measuring the SNR, the Copol, Cross-pol and ASI parameters and thresholds, stopping the transmission of the CW, comparing the measured parameters with thresholds, if at least one parameter does not meet its respective threshold, the API modifies that parameter at the AAT controlled by an antenna control unit, repeating previous steps until all parameters meet their respective thresholds in which the AAT is correctly aligned and polarized; and, calculating a saturation point at which the power of the satellite modem is maximum without distortion.

11 Claims, 9 Drawing Sheets

SATELLITE AUTO ALIGNMENT AND COMMISSIONING METHOD FOR AUTOMATED ANTENNA TERMINALS

CROSS REFERENCE TO RELATED APPLICATIONS

This application claims priority to U.S. Provisional Patent Application No. 62/986,139 filed Mar. 6, 2020, the disclosure of which is hereby incorporated by reference in its entirety.

BACKGROUND

Field of the Invention

The present patent disclosure is directed to a system and method to allow the control and correct alignment of an automated antenna with the support of a measurement instrument from a remote location. Thus, the technical field of the present patent disclosure is the telematic control of automated antennas (parabolic, mechanically flat panel antenna, electronically steerable flat panel antennas, etc.) placed in mobile elements (ships, airplane, vehicle, etc.) or fix elements (building, platforms, etc.) for the correct orientation of the automated antennas to the satellite communication.

Description of Related Art

In the state of the art, U.S. Pat. No. 6,362,772, which describes a system and a method for providing remote viewing of satellite transponder plots, and which is connected to a spectrum analyzer that generates the referred plots, is known. It also discloses control equipment and a server connected to the spectrum analyzer and to an antenna, so local storage of plots is made in the server and, through a remote connection, it is possible to access the server and view the stored plots. This system does not allow the plots evolution to be obtained in real time, since the plot is stored as a photograph, and it is sent to the remote computers. Also, this system does not allow the operation of the measurement system to be commanded to obtain measurement results and plots from a cellular phone terminal, but it requires a remote computer.

In the state of the art, the U.S. Pat. No. 5,577,067, which describes a data acquisition system from a portable spectrum analyzer connected to a telecommunication system is also known. Data captured by the analyzer is transmitted by a telecommunication system to a slave receiver module which is accessible through any way of communication, for example cellular telephony, so maintenance and parameter update tasks are performed. This system requires the development of a particular slave receiver module that although it may use cellular telephony networks to communicate with the telecommunication equipment connected to the measuring equipment, it does not allow to display measurement results and plots on a wireless handheld mobile terminal.

In the state of the art, United States Application U.S. 20110057849A1, which describes the antenna automated alignment based on dipoles to match the satellite polarization, is also known.

In the state of the art it, U.S. Pat. No. 5,966,102A, which describes a central polarization control network (PCN), which is connected to the distribution network and can control the polarization states of the received signals distributed via the distribution network by the radiating elements, is also known.

Therefore, in the technical state of the art, a system that allows the control of an Antenna Control Unit ACU for optimizing the alignment with a server feedback using a measurement device and making all the required adjustments to the automated antenna to maximize the performances, minimize the interference and calibrate the power on satellite terminal for any automated antenna with or without tracking capabilities and satellite constellation is not known.

SUMMARY

In order to achieve the objectives previously mentioned, the present patent disclosure discloses a system and a method that allow monitoring of satellite signals from one or more automated antenna terminals in real time by means of a server.

The present patent disclosure allows information to be sent from a server remotely placed, through an UDP protocol, to an automated antenna terminal provided in a mobile element (ship, plane, cars, etc.), in such a way that the automated antenna terminal is always correctly oriented to a satellite communication due to the information sent from the server to an API installed in a device of the mobile element, i.e., the server commands the satellite modem with the information, and an Antenna Control Unit provided in the mobile element takes actions on the commissioning process in real time machine to machine.

The system of the present patent disclosure, like the systems described in the state of the art, comprises one or more signal capture elements for satellites which are connected to the measurement instrument that obtains traces representing signal parameters, such as a spectrum analyzer. This measurement instrument is connected to the server which commands the measurement instrument to get and process the data parameters and traces obtained by the measurement instrument.

The novelty of the present invention is on the server, which comprises a new framework that allows the communication with one or more automated antenna terminals AAT so the server commands the measurement instrument to obtain measurement information and traces ordered from the automated antenna terminals AAT. Also, an automated antenna terminal with the API (Application Protocol Interface installed) comprises a new framework that allows commanding and controlling the satellite modem through the server and antenna ACU, in order to achieve that functionality.

In one aspect of the present invention, a Satellite Auto-Alignment and Commissioning method for Automated Antenna Terminals is disclosed. The method comprising:
  a) receiving a Multicast information at a satellite modem connected an automated antenna terminal "AAT", being the Multicast information sending from a server in a continuous way;
  b) sending the Multicast information to an Application Protocol Interface "API" connected to the automated antenna terminal "AAT";
  c) transmitting a Clean carrier Wave "CW" from the satellite modem via the automated antenna terminal "AAT" to the server through a satellite communication in a frequency fixed by the Multicast information having a power at the satellite modem controlled by the API;

d) measuring the Signal-to-Noise rate "SNR" of a signal including the Multicast information at the AAT, and extracting, from the Multicast information, COPOL, Cross-pol and ASI parameters along with thresholds of the SNR, COPOL, Cross-pol and ASI parameters;
e) stopping the transmission of the Clean carrier Wave "CW";
f) comparing the measured SNR and the extracted COPOL, Cross-pol and ASI parameters with thresholds;
g) if at least one of the SNR, COPOL, Cross-pol and ASI parameters does not meet its respective threshold, the Application Protocol Interface "API" comprises:
modifying the parameter that does not meet its respective threshold at the AAT controlled by an antenna control unit ACU;
h) repeating steps b) to g) until all SNR, COPOL, Cross-pol and ASI parameters meet their respective thresholds in which the automated antenna terminal "AAT" is correctly aligned and polarized; and,
i) calculating a saturation point named as the One dB Compression Point "1dBCP" at which the power of the satellite modem is maximum without distortion.

The method may further comprise:
receiving the Clean carrier Wave "CW" through at least two antennas with different polarization, at a signal capture element;
selecting an RF output of the signal capture element connected to a measurement instrument, by switching between the at least two antennas commanded by the server;
carrying out a sweep and a measure of the SNR, COPOL, Cross-pol and ASI parameters of the RF output to form a new multicast information in the measurement instrument;
sending the new multicast information to the server;
sending the new multicast information to the hub satellite to be converted into a RF format;
multicasting the multicast information.

In accordance with one or more embodiments, the method may further comprise commissioning the automated antenna terminal "AAT" with the information provided in the Multicast information and information provided in the API such as user login and IP address of the satellite modem.

In accordance with one or more embodiments, the method may further comprise installing the Application Protocol Interface "API" in the Antenna Control Unit, and connecting the Antenna Control Unit to the automated antenna terminal "AAT" and to the satellite modem.

In accordance with one or more embodiments, the method may further comprise installing the Application Protocol Interface "API" in the satellite modem, and connecting the satellite modem to the automated antenna terminal "AAT" and to the Antenna Control Unit.

In accordance with one or more embodiments, the method may further comprise installing the Application Protocol Interface "API" in a computer, and connecting the computer to the automated antenna terminal "AAT", to the satellite modem and to the Antenna Control Unit.

In another aspect of the present invention, a Satellite Auto-Alignment and Commissioning system for Automated Antennas Terminals is disclosed. The system comprises:
an automated antenna terminal "AAT";
a satellite modem connected the automated antenna terminal "AAT"; the satellite modem is configured to receive a Multicast information, being the Multicast information sending from a server in a continuous way;
an Application Protocol Interface "API" that is configured to receive the Multicast information from the satellite modem;
the Application Protocol Interface "API" is further configured, for the satellite modem, to transmit a Clean carrier Wave "CW" via the automated antenna terminal "AAT" to the server through a satellite communication in a frequency fixed by the Multicast information having a power at the satellite modem controlled by the API;
the Application Protocol Interface "API" is further configured to measure the Signal-to-Noise rate "SNR" of a signal including the Multicast information at the AAT, and extracting, from the Multicast information, the COPOL, Cross-pol and ASI parameters along with thresholds of the SNR, COPOL, Cross-pol and ASI parameters;
the Application Protocol Interface "API" is further configured, for the satellite modem, to stop the transmission of the Clean carrier Wave "CW";
the Application Protocol Interface "API" is further configured to compare the measured SNR and the extracted COPOL, Cross-pol and ASI parameters with thresholds; and, if at least one of the SNR, COPOL, Cross-pol and ASI parameters does not meet its respective threshold, the Application Protocol Interface "API" is further configured to modify the parameter that does not meet its respective threshold at the AAT controlled by an antenna control unit ACU;
the Application Protocol Interface "API" is further configured to calculate a saturation point named as the One dB Compression Point "1dBCP" at which the power of the satellite modem is maximum without distortion.

In accordance with one or more embodiments, the system may further comprise:
a signal capture element that is configured to receive the Clean carrier Wave "CW" through at least two antennas with different polarization;
a measurement instrument connected to an RF output of the signal capture element; the RF output is configured to be switched between the at least two antennas commanded by the server;
the measurement instrument is further configured to carry out a sweep and a measure of the SNR, COPOL, Cross-pol and ASI parameters of the RF output to form the multicast information in the measurement instrument;
the measurement instrument is further configured to send the multicast information to the server;
the server is further configured to send the multicast information to the hub satellite to be converted into a RF format;
the hub satellite is further configured to multicast the multicast information.

In accordance with one or more embodiments, the server may further comprise: a server control module; a satellite multicast communication control module, which in turn comprises a multitasking sub-module; a server storage module, which in turn comprises: a user identification and authentication sub-module; a measurement system operation save & recall set-up sub-module; an instrumentation command control module which in turn comprises a shared instrumentation coordination sub-module; a data base.

In accordance with one or more embodiments, the API may further comprise: a satellite modem command editing and control module; a command editing and control module, which in turn comprises: a frequency sub-module; a power sub-module; a transmit sub-module; a transmit off sub-module; a transmit One decibel Compression Point (1 dB CP) sub-module; a display selection sub-module; a measurement sub-module; a report parameter sub-module; a commissioning report sub-module; the User Authentication and Identification sub-module; a receive only satellite link; a math processor; and, a multicast module.

In accordance with one or more embodiments, the ACU may further comprise: a connect module; a measurement trace limit mask sub-module; an ACU computer interface screen; and a graphics module comprising: a processing sub-module; a zoom-in sub-module; a display; and, an ACU computer non-volatile memory.

Another novelty introduced by the present patent disclosure consists in including a RF Switch (between multiple possible signal capture elements and the measurement instrument with synchronization, this allows cross-pol and adjacent satellite measurements) and its control mechanisms, allowing the selection of a particular input signal for performing its measurements from the remote server. In this way, the server requires for the API changing the RF switch input in an automated way for obtaining the cross-polarization isolation measurements by alternating two inputs, in an instrument sweep synchronized way, the input switching selection at the matrix between two orthogonal polarized input signals (i.e. vertical and horizontal polarized signals for cross-pol; or i.e. horizontal and horizontal from adjacent satellites signals for adjacent satellite interference).

To better illustrate and explain this description, following a set of diagrams representing the present patent disclosure is shown, as an integrating part of this document, intended for illustrative, but not limiting, purposes.

DETAILED DESCRIPTION OF THE DRAWINGS

The following is a description of several embodiments of the present patent disclosure based on the above mentioned figures.

Figure 1:
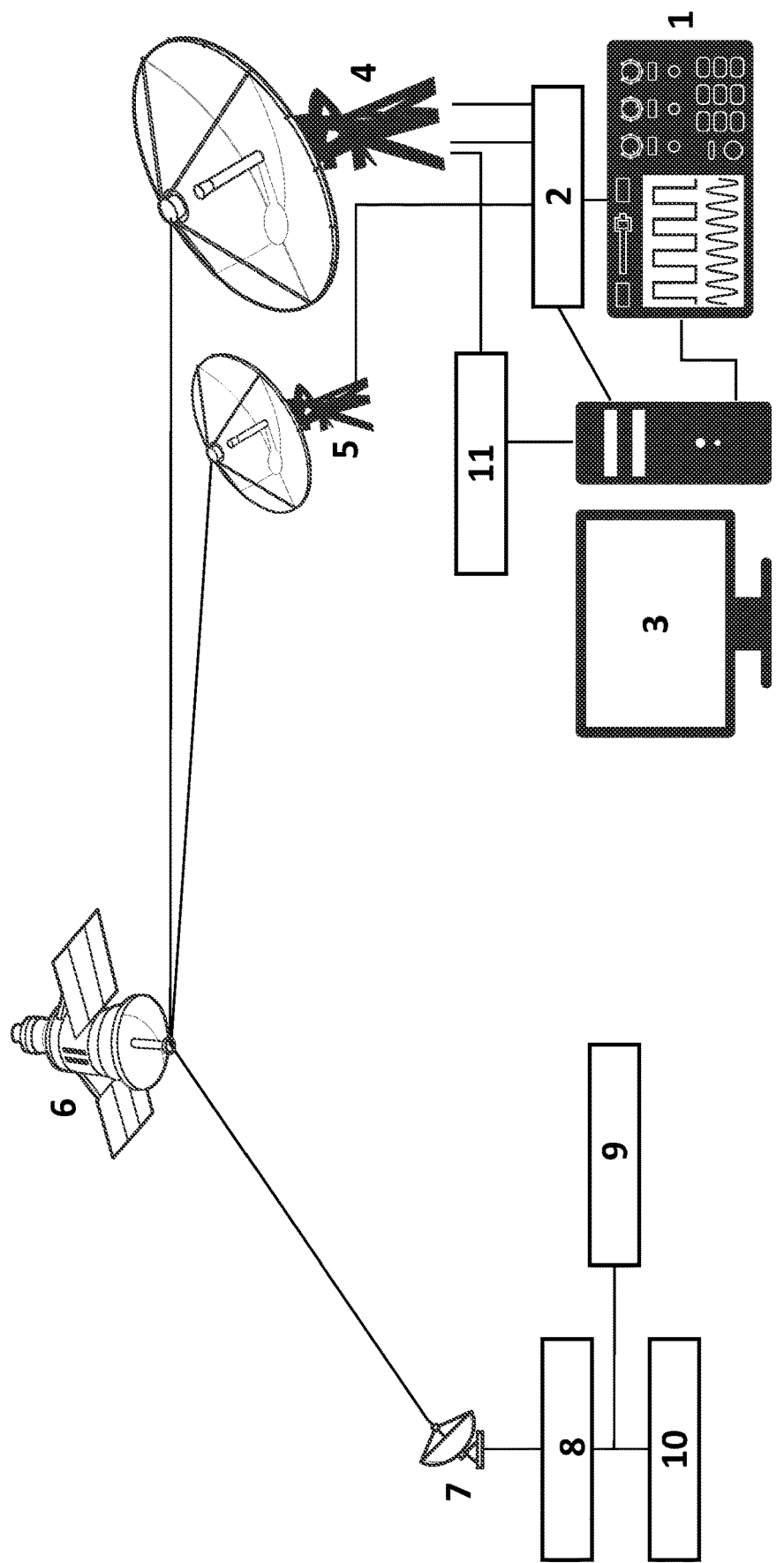
FIG. 1 depicts a block diagram of the satellite auto alignment and commissioning system for Automated Antenna terminals and, conceptually, how satellite signals parameters are measured and multicast information (data measurements) is obtained.

In FIG. 1, a preferred embodiment of the present patent disclosure is shown, where the measurement instrument 1 is connected to the RF switch (RF switch or Switching Matrix of solid state, electromagnetic, or other of RF switching devices) 2 both items are governed by the server 3 through LAN connection, the RF Switch 2 is connected to at least one antenna 4 or more antennas 5 via RF cables to capture the signals transmitted by the satellite 6. Obviously, the present patent disclosure can be applied to obtain remotely the measurements and traces of terrestrial signals, cable headers parameters, etc., through the satellite connection of a measurement instrument in the location where the measurements need to be done.

The measurement instrument 1 is formed by conventional signal measurement analyzers, such as Spectrum Analyzers, Vector Analyzers, Digital Spectrum Analyzer, data acquisition card, FPGA, etc., that receive the signals from the antenna 4, in order to perform measurements in a conventional way.

The measurement instrumentation 1 is controlled by the server 3. The server 3 at the same time, through the satellite 6, communicates with one or more automated antenna terminals 7 with an Application Protocol Interface "API" 901. In one of the preferred embodiments, the API 901 is installed in an external API PC terminal 9. In other preferred embodiment, the API 901 is deployed in the satellite modem 10 (satellite modem, router, access point, etc.) with LAN connection, or the API is deployed in the Antenna Control Unit 8 with LAN connection to the satellite modem 10.

The communication between the server 3 and the API 901, wherever the API is installed (ACU 8, external API PC terminal 9, satellite modem 10) is done through UDP Unicast or Multicast connection, already well known protocols, and all of it through a communication satellite network 6. The connection between the ACU 8, the external API PC terminal 9 and the satellite modem 10 is TCP/IP and HTTP, that can be private (internal), public network or Internet.

Figure 2:
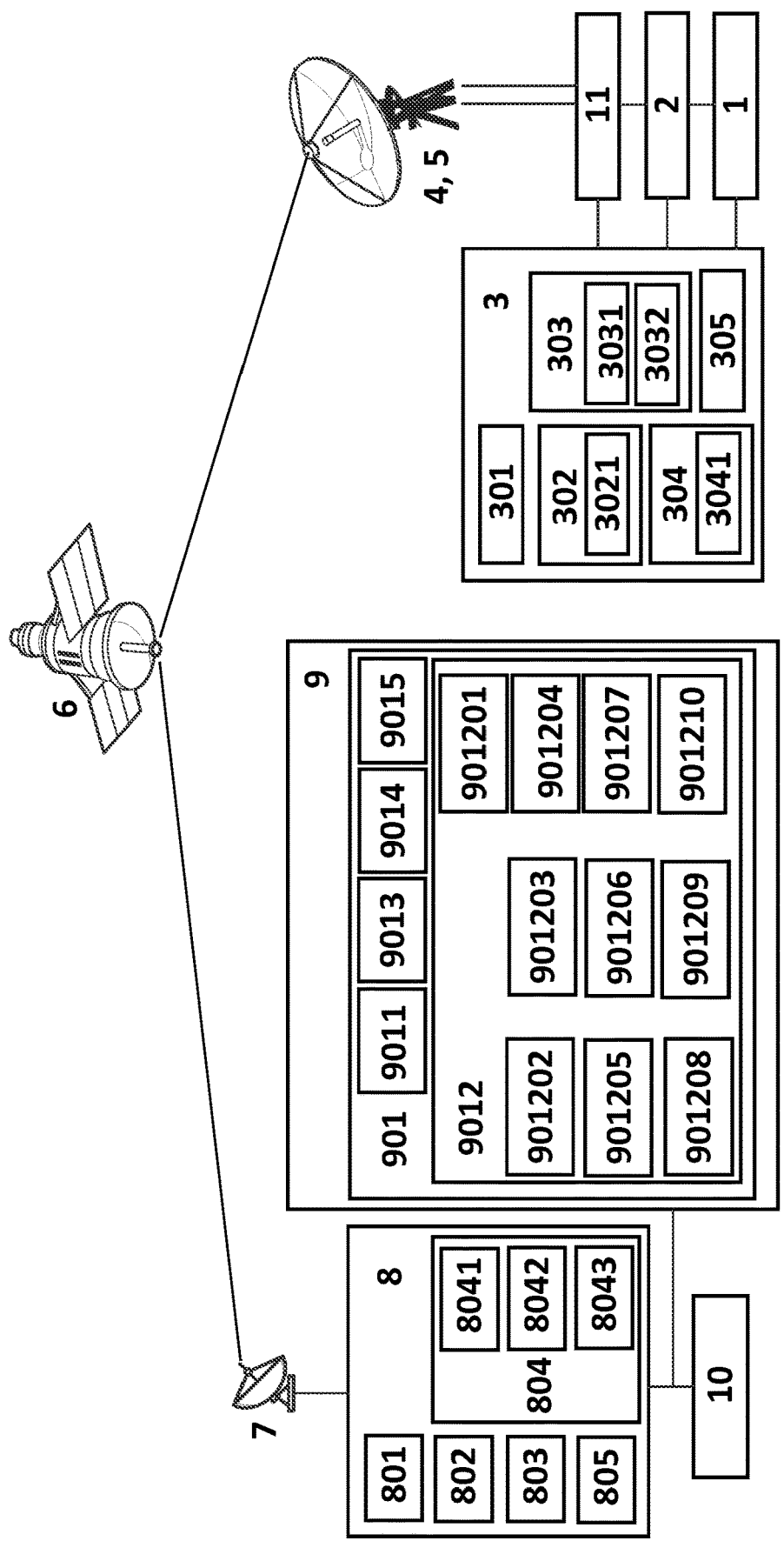
FIG. 2 depicts a block diagram of the satellite auto alignment and commissioning system for Automated Antenna terminals, including module and sub-modules.

In FIG. 2, the server 3 is shown. The server 3 comprises the following modules and sub-modules:

the server control module 301 for controlling the measurement instrument 1 in order to obtain and send measurement information in the form of multicast information, obtained by the measurement instrument, to the automated antenna terminal 7 through the satellite 6;

the satellite multicast communication control module 302 for communicating with the automated antenna terminals 7 with reception only and comprising a multitasking sub-module 3021 for providing concurrent access to multiple simultaneous users;

the server storage module 303 which includes a user identification and authentication sub-module 3031 to perform the access validation, once the communication has been established, allowing the access to send a report with the results (i.e.: a file with the PASS/FAIL and the test measurements: Copol, CrossPol, ASI, 1dBCP, Satellite Modem parameters) of the commissioning;

the instrumentation command control module 304 for managing the commands sent by the automated antenna terminal 7 to command the satellite modem 10, allowing the control of the satellite modem 10, and to perform the transmission maximization (Copol), Null of the Crosspol interference (Crosspol) and transmitter saturation point (1dBCP);

the data base 305 which stores that data (i.e.; the above results) that allows to remotely control the automated antenna terminal 7 from the server 3 through satellite communication.

This configuration allows the commissioning (ready to start) of the automated antenna terminal 7 with the measurement information obtained by the measurement instrument 1 and shared with satellite UDP traffic capability acting over the Antenna Control Unit 8 through the API 901 on the satellite modem, which represents a significant advantage; and, in a way that the system can be connected to any kind and model of automated antenna terminal and satellite modem connected to the automated antenna terminal.

Another advantage introduced by the present patent disclosure consists in providing simultaneous communication capabilities with the server 3 to multiple automated antenna terminals 7. In order to achieve this function, the server 3 comprises the multitasking sub-module 3021 and the instrumentation command control module 304, for controlling the commands sent to the automated antenna terminal 7. The instrumentation command control module 304 comprises the shared instrumentation coordination sub-module 3041 to share the measurement instrument 1 transparently among multiple automated antenna terminal 7 in real-time.

Also, the server storage module 303 includes the measurement system operation save & recall set-up sub-module 3032 which manages pre-defined measurement parameter value set-ups and the automated antenna terminal 7 comprises the measurement information with a Pass/Fail result the criteria and parameters of the satellite modem 10.

The communication between the satellite modem 10 and the server 3 employs TCP/IP and HTTP protocols, very popular and well known in the data communications world.

In FIG. 2, the API is also shown. The API 901 comprises: a satellite modem command editing and control module 9011 for the selective edition of commands and its transmission to the satellite modem 10 through the API, and a command editing and control module 9012 for the selective edition of commands and its transmission to the automated antenna terminal 7 through the API 901.

In embodiment of the present patent disclosure, the API 901 is deployed inside the Antenna Control Unit 8 for commissioning purpose. The API 901 further comprises the receive only UDP satellite link 9013 for connecting the automated antenna terminal 7 with the server 3, and the math processor 9014 configured to command the satellite modem 10 and to receive the measurement information. Also, it is possible to have the API PC terminal 9, i.e., an external PC to host the API 901 as a bridge to the automated antenna terminal 7 and satellite modem 10.

The communication between the automated antenna terminal 7 and the server 3 can be made using the satellite network by connecting the server 3 to the satellite hub 11 and establishing the communication with the satellite modem 10 in only reception mode using UDP (Multicast or Unicast).

In other implementation of the present patent disclosure, the automated antenna terminal 7 has the Antenna Control Unit "ACU" 8 which is an integrated computer that can host the API 901 or the API PC terminal 9 to host the API with a local area network (LAN) port.

The ACU 8 used in the present patent disclosure as shown in FIG. 2, comprises a connect module 801, which is configured to command the satellite modem 10 in order to transmit and take measurements at the server 3 and to receive those measurements from the server 3 controlling the measurement instrument 1.

The ACU 8 further comprises the measurement trace limit mask sub-module 802 to indicate where and when the measurement results are above and/or below the defined upper and lower measurement thresholds to detect possible failures, events, result Pass/Fail, etc. The measurement results and the measurement thresholds are included in the measurement information. The measurement thresholds define an upper and a lower limit, establishing a gap or margin; also, it is possible to define relative upper and lower limits taking any single point of the measured trace as a reference.

The ACU 8 further comprises the graphics module 804, for displaying on the ACU computer interface screen 803 the traces obtained from the measurement instrument 1, this module is connected to the ACU computer non-volatile memory 805 to store different traces obtained by the measurement instrument 1 and record the spectrum activity during a given time period. Additionally, the graphics module 804 comprises a processing sub-module 8041 to process and display in real-time several traces simultaneously, like the case of a cross-polarization isolation measurement and adjacent satellite interference graphics representation, for example, where three signals from three different RF switch inputs are displayed simultaneously. Also, the graphics module 804 comprises the zoom-in sub-module 8042 to zoom-in the represented traces and the display 8043 to display in real time the maximum hold and minimum hold traces during a given time period. The numeric values are also available when the API 901 is not in graphic mode.

The command editing and control module 9012 of the API 901 in the ACU 8 as shown in FIG. 2, facilitates the selective edition of commands that are sent to the satellite modem 10 through the API 901. Also, it is possible to send a command to make one or several measurements.

The command editing and control module 9012 of the API 901 in the ACU 8 as shown in FIG. 2 comprises: the frequency sub-module 901201 to set the frequency parameters at the satellite modem (start, stop, center, span, offset), a power sub-module 901202 to adjust power in the satellite modem: frequency and amplitude, a transmit sub-module 901203 to start transmitting a Clean carrier Wave (CW) to the satellite in the frequency and power specified, a transmit off sub-module 901204 to stop the CW at the satellite modem with information reporting through the API, a transmit One decibel Compression Point (1 dB CP) sub-module 901205 to calculate the saturation point of the transmission, a display selection sub-module 901206 to establish a selection of different traces to be displayed on the ACU computer screen, a measurement sub-module 901207 to specify one or multiple measurements (signal center frequency, amplitude, bandwidth, power, C/N ratio, cross-pol isolation, adjacent satellite interference, 1 dB Compression Point) on the displayed trace at the ACU computer screen, or numerically at the API output, a report parameter sub-module 901208 to specify or select the measurement parameter value to be used by processing algorithms applied to raw measurements readings in order to compute elaborated pass/fail results of previously mentioned measurements, and a commissioning report sub-module 901209 to specify the qualification of the measurements and full process.

The frequency sub-module 901201 comprises a block for selection or value definition for each of the satellite modems (modems or routers, or remotes or similar) following frequency parameters: Modem IP, User Authentication and Identification and Multicast IP.

The satellite modem command editing and control module 9011 comprises: a block to receive multicast data, a block to adjust frequency, a block to adjust power and a block to save transmitter saturation point 1dBCP.

The transmit sub-module 901203 comprises a block for selection or value definition for each of the satellite modem 10 (modems or routers, or remotes or similar) following amplitude parameters: a center frequency, power, a CW-On and a Transmitter Compression Point, 1 dB Compression Point (1dBCP).

The transmission off sub-module 901204 comprises a block for selection or value definition for each of the satellite modem 10 (modems or routers, or remotes or similar) following amplitude parameters: CW-Off, save power, save frequency, send Signal to Noise Ratio (SNR), send Copol, send Cross-pol information, and send Adjacent Satellite Interference (ASI) information.

The measurement sub-module 901207 to specify one or multiple measurements (signal center frequency, amplitude, bandwidth, power, C/N ratio, cross-pol isolation, ASI) on the displayed trace at the ACU computer interface screen 803 or numeric in the API 901 comprises: a block to selectively command the execution of each measurement in a single or continuous way, a block to Signal to Noise Ratio (SNR), a block to Copol, a block to Cross-pol Isolation, a block to Adjacent Satellite Interference, and a block to Transmitter Saturation 1 dB Compression Point.

The measurement sub-module 901207 is also deployed in the server, used to specify or select the measurement parameter values to be used by processing algorithms applied to raw measurements readings in order to compute elaborated results of previously mentioned measurements comprises: signal modulation format selection: analog or digital, used for computation of the power measurement, reference frequency bandwidth for the normalization of the noise measurement result used in the calculation of the C/N ratio measurement, signal center frequency offset to perform the noise measurement used in the calculation of the C/N ratio measurement, amplitude offset in dB from maximum amplitude point of signal's trace to perform the signal bandwidth measurement, input switching position of the cross polarized signal to perform the cross-polarization isolation measurement, and input switching position of the co polarized signal to perform the adjacent satellite interference measurement.

The display selection sub-module 901206 used to establish a selection of different traces to be displayed on the ACU computer interface screen 803 also comprises: a block for defining the storage place in the ACU computer memory for measurement traces, a block for editing the measurement results with an external standard word processor, and a block for printing the measurement results and traces on a printer connected to the ACU computer.

Figure 3:
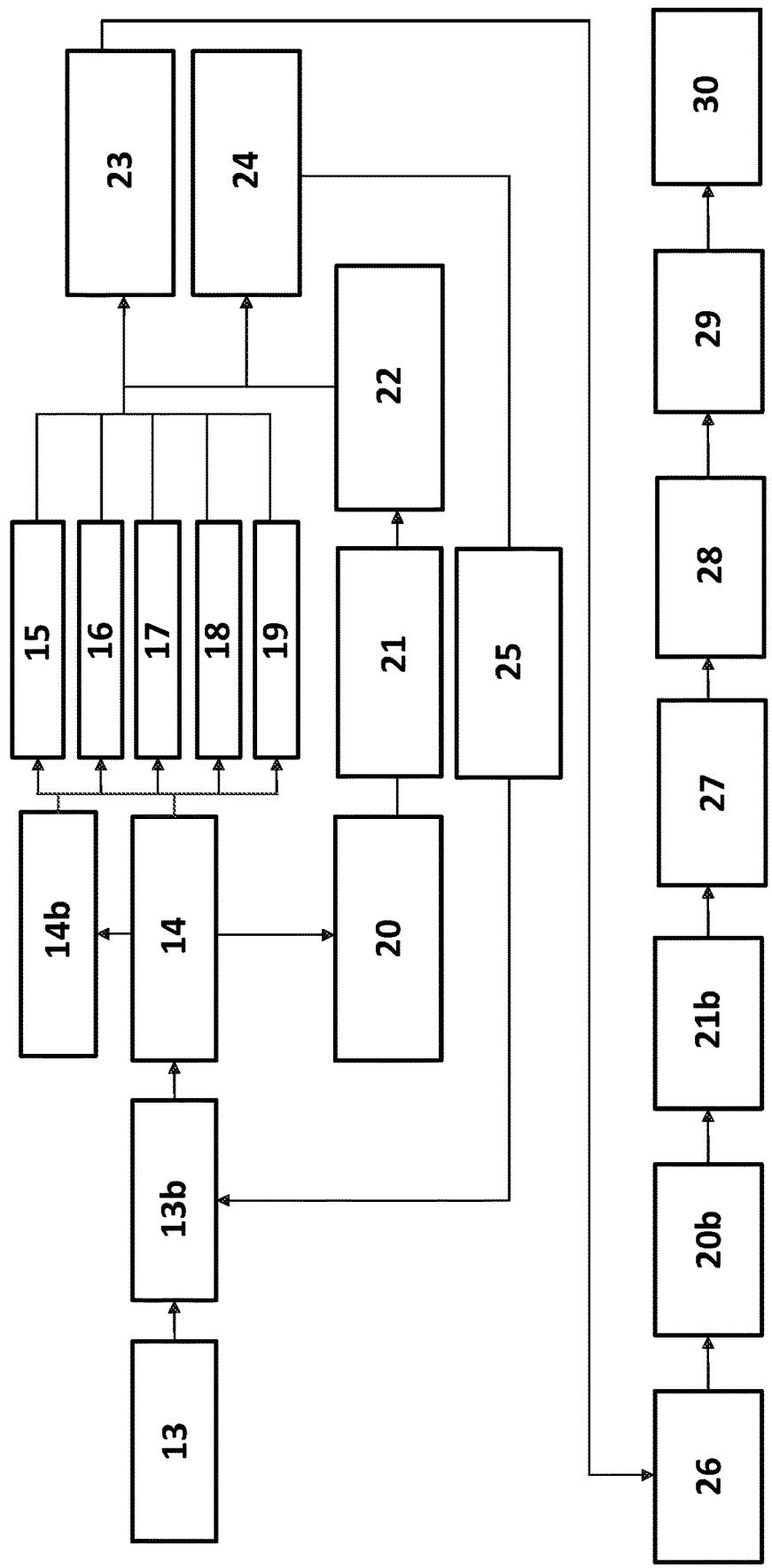
FIG. 3 depicts a functional block diagram of the API added to a conventional computer and its connection to the conventional modules of that computer to get from it the management capability of satellite modem and data acquisition at the measurement instrument.

In FIG. 3, it is shown an embodiment in which the Application Protocol Interface "API" 901 is in an API PC terminal 9.

For that purpose the API PC terminal 9 has LAN connection with the satellite modem 10 and also with the ACU 8. The ACU 8 requires to Connect 13 the API PC terminal 9 with the satellite modem 10. Thus, the ACU 8 sends to the API PC terminal 9 an IP address, login/password credentials and Multicast Address. The API PC terminal 9 connects to the satellite modem 10 in that particular IP address and login/password credentials, so that the connect module 801 carries out 13*b* the first adjustment of the Automated Antenna Terminal 7. Consequently, the API 901 starts receiving multicast information (data measurements via UDP protocol) 14 from the server 3 through the satellite 6 via UDP connection. The ACU 8 commands the API PC terminal 9 for carrying out a measurement of the Signal to Noise "SNR" 15, Copol 16, Cross-pol 17 and ASI 18.

Figure 6:
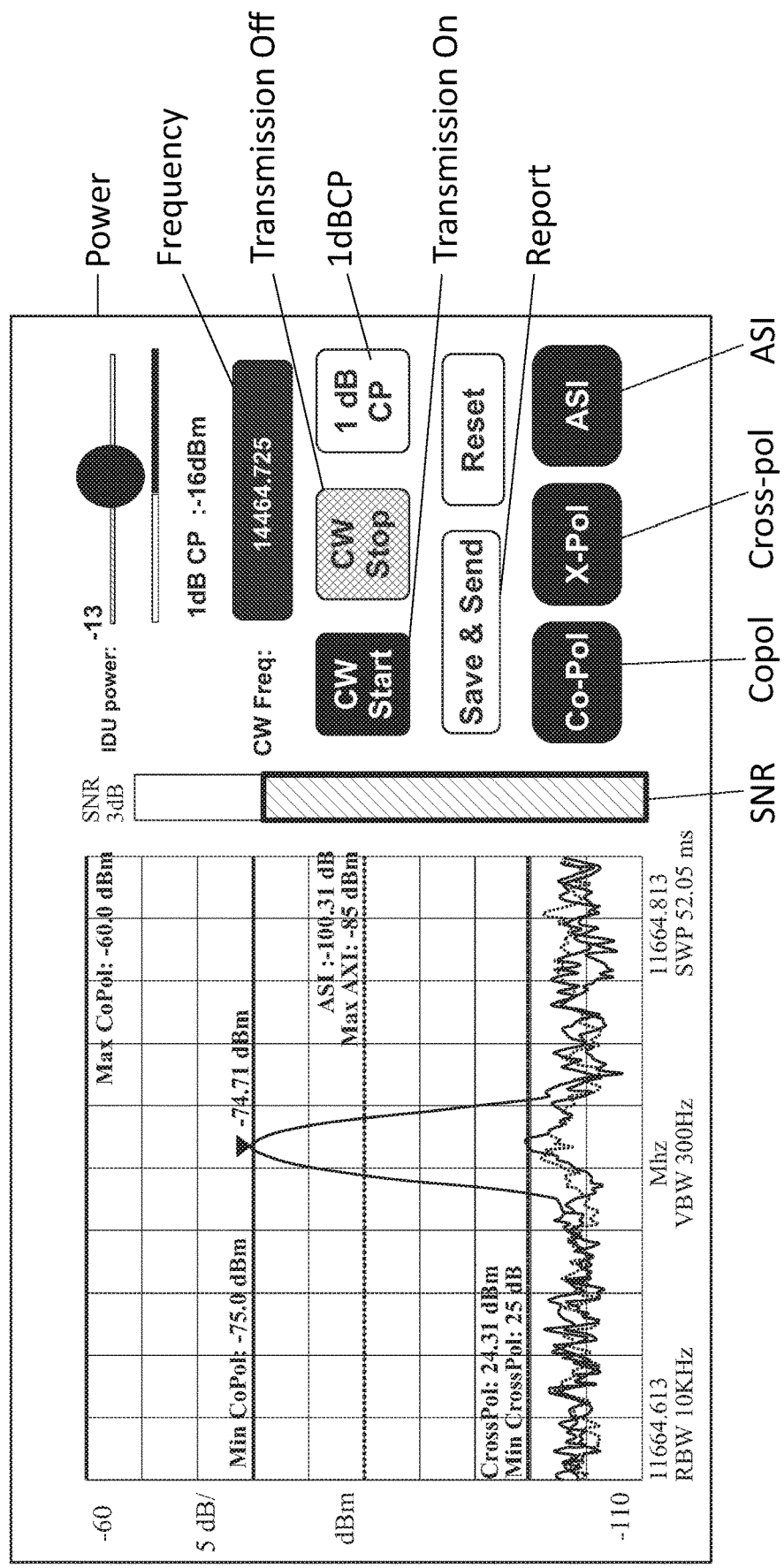
FIG. 6 depicts a graphical display with the traces from the measurement instrument and loaded on the display module, this could be shown in the API PC terminal, ACU, or satellite modem display and interfaces.

Then the API 901 commands the satellite modem 10 to start the Clean carrier Wave (CW) transmission 20 in a particular frequency fix by the Multicast information 14, to default the power of the satellite modem 21. Then, the API 901 analyzes the Signal to Noise Ratio (SNR) 15 from the satellite modem 10, and the Copol 16, Cross-pol 17 and ASI 18 parameters from the multicast information 14 and stop the CW transmission 22. Then, the API PC terminal 9 sends to the ACU 8, the Signal to Noise Ratio SNR 15, Copol 16, Cross-pol 17, ASI 18, and Thresholds 19. If the ACU 8 has a display 8043, the spectrum graphics can be seen at the ACU display 14*b* as a spectrum analyzer plot (FIG. 6).

If the measurement results (i.e., Signal to Noise "SNR" 15, Copol 16, Cross-pol 17 and ASI 18) meet the required Thresholds 19, then the commissioning would be Pass 23, if not, the result will be Fail 24 and the ACU 8 should optimize the alignment and the antenna polarization of the AAT 7, and start from "Connect 13 the API PC terminal 9 with the satellite modem 10", repeating the process until thresholds are met and the result is Pass 23.

The next step is to perform the One dB Compression Point (1dBCP) 26, the ACU 8 commands the API PC terminal 9 and the API 901 starts CW transmission 20*b* and synchronizes the reception of the Multicast information 14 and increases the power of the satellite modem 10 until the gain is not linear and the saturation point is obtained 21*b*. Then, the API PC terminal 9 reports the 1dBCP 27 to the ACU 8.

To finalize the process, the ACU 8 then requires the API PC terminal 9 to save results 28 and configure the satellite modem 10 with the required parameters, the satellite modem 10 gets two-ways communication with the server 3, and the API 901 sends a report-back to the server 3 with the commissioning pass result 29 through the satellite 6. The results and report are received in to the server 3 which updates the satellite hub 11 with the new results and data in the report in the satellite hub 11 updating the satellite modem 10 the new configuration.

Additionally, the API 901 to be more visual on the ACU 8 interface, on top of the its conventional structure, comprises the connect Module 801 that is connected 13 to a transmit sub-module 901203, the frequency sub-module 901201, and the transmit off sub-module 901204, the transmit One decibel Compression Point (1 dB CP) sub-module 901205, the report parameter module 901208 and to the display selection sub-module 901206 to display 14*b* the parameters: Signal to Noise "SNR" 15, Copol 16, Cross-pol 17 and ASI 18.

Figure 4:
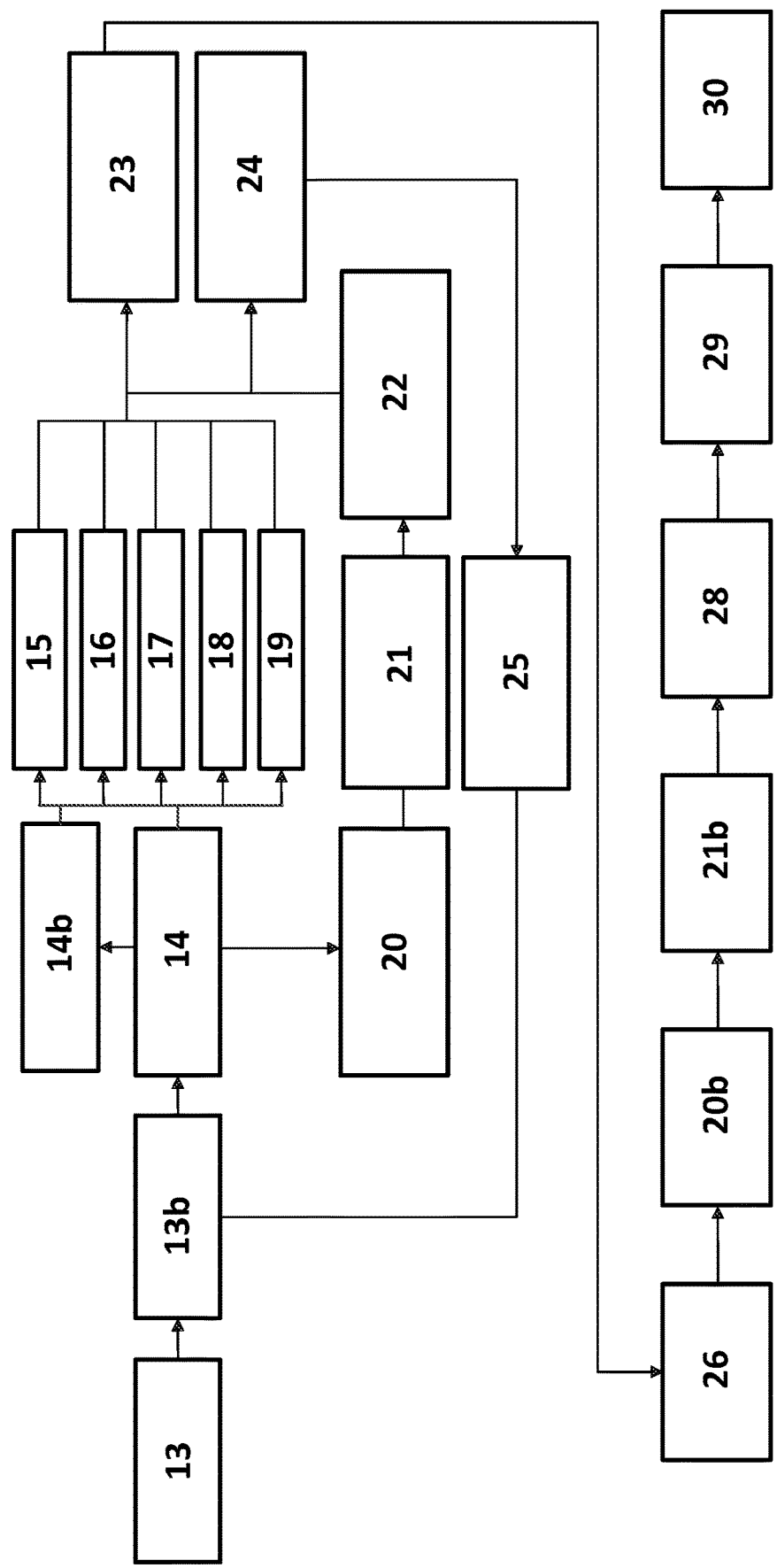
FIG. 4 depicts a functional block diagram of the framework added to a conventional ACU and its connection to the conventional modules of that ACU computer to get from it the management capability of satellite modem through the API and data acquisition and automation with the measurement instrument.

In another embodiment, the API 901 is embedded in the ACU 8, having the following workflow as shown in FIG. 4.

For that purpose the ACU 8 has LAN connection with the satellite modem 10. The ACU 8 requires to Connect 13 with the satellite modem 10 through the API 901 and starts receiving Multicast information 14. The API 901 carries out 13*b* the first adjustment of the Automated Antenna Terminal 7 with the parameters Signal to Noise "SNR" 15, Copol 16, Cross-pol 17 and ASI 18, all of the parameters included in the Multicast information.

Then the API 901 commands the satellite modem 10 to Start Clean carrier Wave (CW) transmission 20 in a particular frequency fix by Multicast information 14, to default the power 21 of the satellite modem 10, then measure the Signal to Noise Ratio SNR 15 from the satellite modem 10, and analyze the Copol 16, the Cross-pol 17 and the ASI 18 from the multicast information 14 and stop the CW 22. Then API 901 replies to ACU Signal to Noise 15, Copol 16, Cross-pol 17, ASI 18, and Thresholds 19. If the ACU 8 has a display, the spectrum graphics can be seen at the ACU display 14b.

If the measured analyzed parameters (i.e.: SNR, Copol, Cross-pol and ASI) meet the required Thresholds, then the AAT 7 is correctly aligned and polarized, i.e., the result is "Pass" 23. If not, the AAT 7 is not correctly aligned, i.e.: the result is "Fail" 24, and the ACU 8 will optimize the alignment and polarization of the AAT 25 and start from "carrying out the first adjustment of the AAT" 13b, repeating the process until thresholds are met and the result is Pass 23.

The next step is to perform the One dB Compression Point (1dBCP) 26, API 901 starts the Clean carrier Wave (CW) transmission 20b and synchronizes the reception of the Multicast information 14 and increases on the satellite modem 10, the power range until the gain is not linear and the saturation point is obtained 21b.

To finalize the process the API 901 to saves results 28 and configure with the required parameters (i.e.: SNR, Copol, Cross-pol and ASI) the satellite modem 10, the satellite modem gets two way communication with the server 3 and the API 901 sends a report back to the server 3 the commissioning pass result 29 through the satellite 6.

The result and report is received in to the server 3 through the satellite hub 11 and the server 3 uploads of the commissioning configuration information 30 in to the satellite hub 11 providing the AAT 7 the right configuration.

Additionally, the API 901 to be more visual on the ACU 8 interface, on top of the its conventional structure, comprises the connect Module 801 that is connected 13 to a transmit sub-module 901203, the frequency sub-module 901201, and the transmit off sub-module 901204, the transmit One decibel Compression Point (1 dB CP) sub-module 901205, the report parameter module 901208 and to the display selection sub-module 901206 to display 14b the parameters: Signal to Noise "SNR" 15, Copol 16, Cross-pol 17 and ASI 18.

Figure 5:
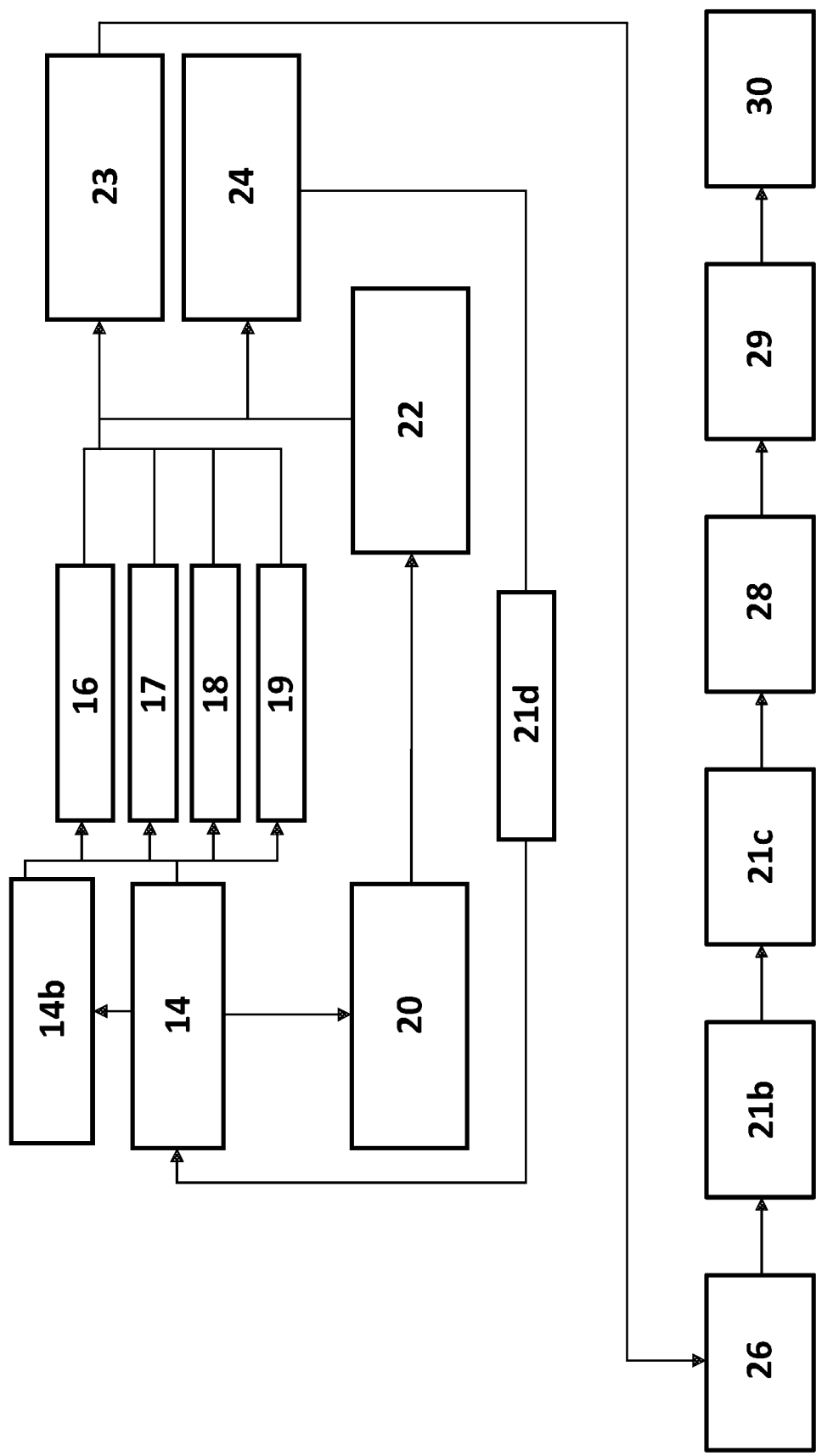
FIG. 5 depicts a functional block diagram of the framework added to a conventional satellite modem and its connection to the conventional modules of that satellite modem to get from it the management capability of satellite modem through the API and data acquisition and automation with the measurement instrument.

Another possibility shown in FIG. 5, is to embed the API 901 in the satellite modem 10, it will be described the implementation example of the API terminal virtualized in the satellite modem 10.

For that purpose the satellite modem 10 has LAN connection with the ACU 8. The satellite modem 10 receives Multicast information 14.

The satellite modem 10 Starts Clean carrier Wave (CW) transmission 20 in a particular frequency fix by Multicast information 14, then analyze Copol 16, Cross-pol 17 and ASI 18 from the multicast information 14, and stop the CW transmission 22. Then the satellite modem 10 replies to ACU Signal to Noise 15, Copol 16, Cross-pol 17, ASI 18, and Thresholds 19. If the satellite modem 10 or ACU 901 has a display the spectrum graphics can be seen at the satellite modem or ACU display 14b.

If the analyzed results meet the required Thresholds, then the installation would be Pass 23, if not, the result will be Fail 24 and the satellite modem 10 will notify the ACU 8 the need to optimize the alignment and polarization of the AAT and start from 20 repeating the process until thresholds are met and the result is Pass 23.

Figure 9:
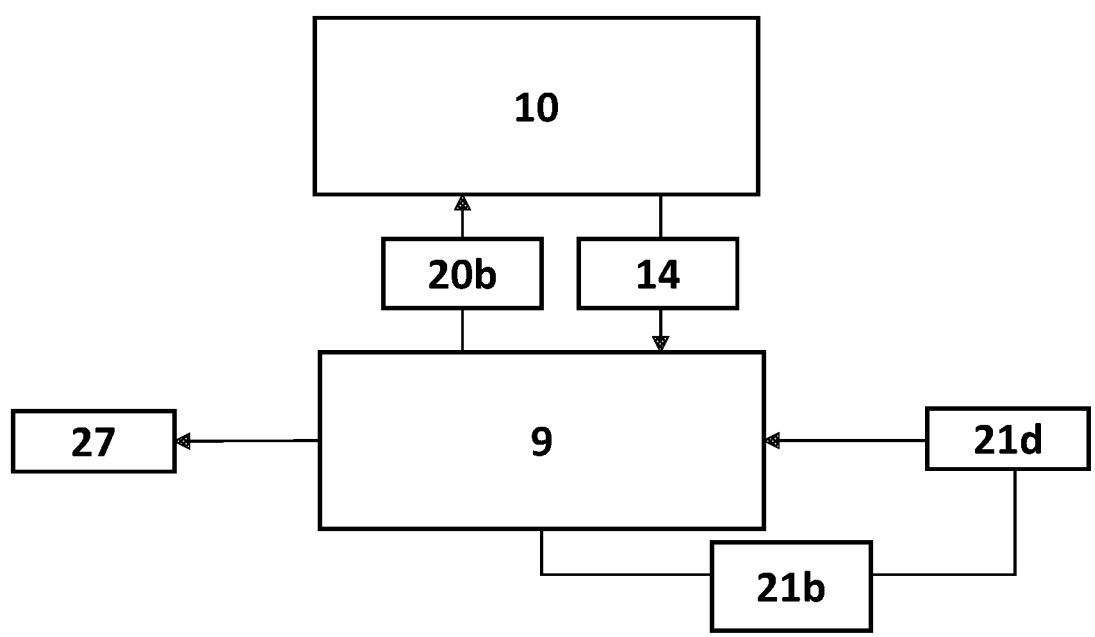
FIG. 9 depicts a functional block diagram of the 1dBCP selection sub-module included in the transmit sub-module of the API.

The next step is to perform the One dB Compression Point (1dBCP) 26 (see FIG. 9), satellite modem 10 starts the Clean carrier Wave (CW) transmission 20 and synchronizes the reception of the Multicast information 14 and increases on the power range until the gain is not linear and the saturation point is obtained 21b, for this the CW increases 1 dB the output power on the satellite modem 20b and take four measurements 14 (the measurement of the parameters: Signal to Noise "SNR" 15, Copol 16, Cross-pol 17 and ASI 18), then add 1 dB more 21d, and so on until the gain decreases so we find the saturation point 21b and the satellite modem 10 stores the 1dBCP 21c to the last value obtained before saturation.

To finalize the process the satellite modem 10 saves results 28 and configure its parameters, the satellite modem 10 gets two way communication with the server 3 and it sends a report-back to the server 3 the commissioning pass result 29 through the satellite 6.

The result and report get to the server 3 through the satellite hub 11 and the server 3 uploads of the commissioning configuration information 30 in to the satellite hub 11 updating the satellite modem 7 the new configuration.

Additionally, the API 901 to be more visual on the satellite modem 10 interface, on top of the its conventional structure, comprises the connect Module 801 that is connected 13 to a transmit sub-module 901203, the frequency sub-module 901201, and the transmit off sub-module 901204, the transmit One decibel Compression Point (1 dB CP) sub-module 901205, the report parameter module 901208 and to the display selection sub-module 901206 to display 14b the parameters: Signal to Noise "SNR" 15, Copol 16, Cross-pol 17 and ASI 18.

The system and method of the above described embodiments can be initiated as follows.

The server 3 from its server control module 301 can command the API through the satellite hub 11 and satellite modem 10 on any event (i.e. satellite change, beam change, location change, maintenance task, etc.) for performing the full automated antenna terminal 7 commissioning process.

The ACU 8 can command the API 901 directly on any event (i.e. satellite change, beam change, location change, maintenance task, etc.) for performing the full automated antenna terminal 7 commissioning process.

The satellite modem 10 can command the API through the satellite hub 11 and satellite modem 10 on any event (i.e. satellite change, beam change, location change, maintenance task, etc.) for performing the full automated antenna terminal 7 commissioning process.

The user on the display of the ACU, satellite modem or API can command the API directly from the screen on any event (i.e. satellite change, beam change, location change, maintenance task, etc.) for performing the full automated antenna terminal 7 commissioning process with Graphics.

Figure 7:
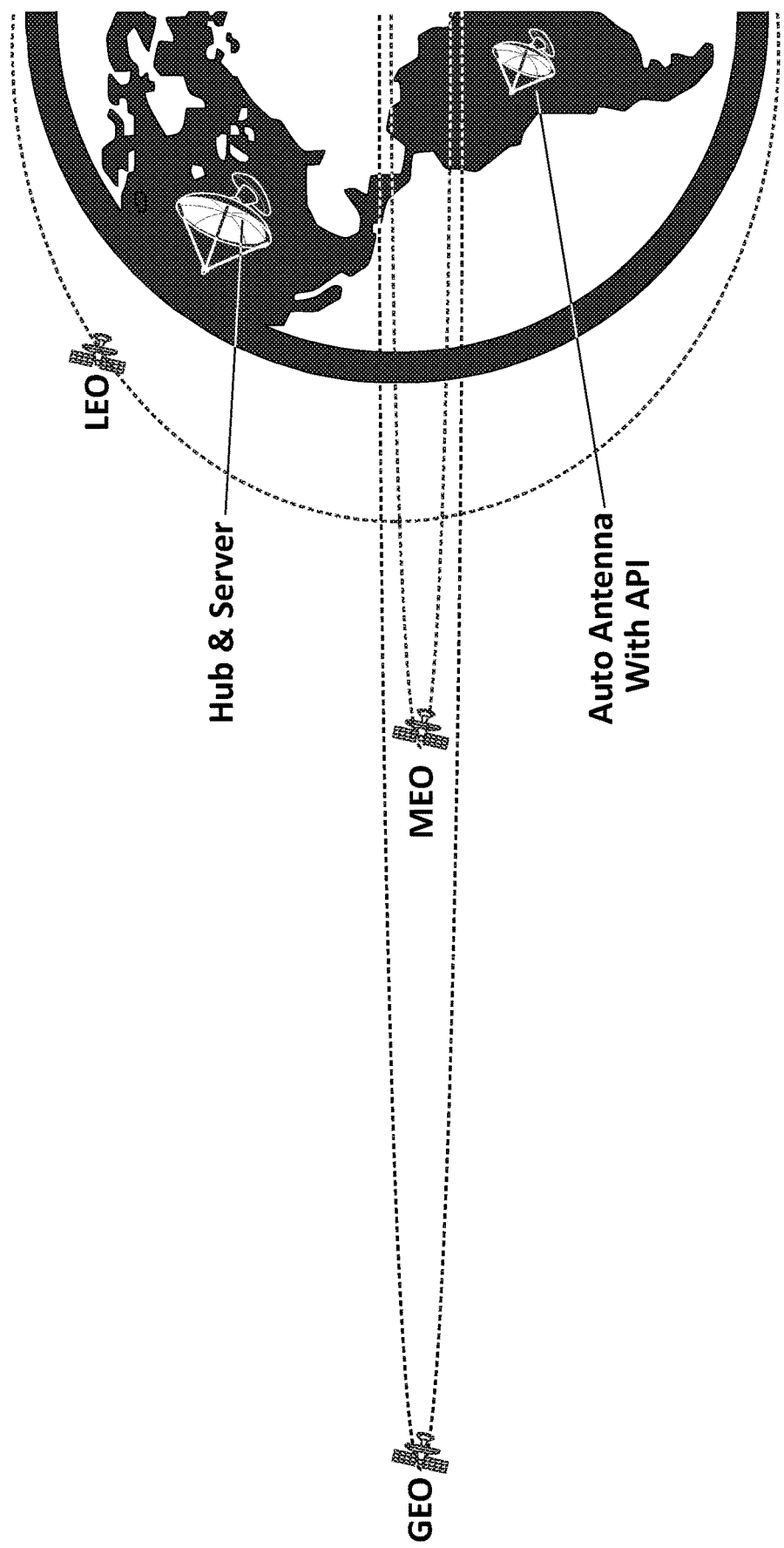
FIG. 7 depicts a diagram of the communications from the hub server in the LEO, MEO or GEO scenario, applicable to all type of payloads and frequency ranges.

The above three embodiments have in common the following, being the most general description of the present patent disclosure and also being applicable to any kind of satellite communication, i.e., LEO, GEO, MEO, etc., (see FIG. 7).

On the basis of the mentioned descriptions of the embodiments, it is understood that when a ACU 8 aims to control the satellite modem 10 and obtain real-time measurements from the measurement instrument 1 through the satellite network 6, the ACU 8 will request it through the API 901; the satellite modem 10 is then commanded by the command editing and control module 9012 that coordinates the operation of the different sub-modules, initializing all the subsystems within the system, and communicating them during the execution period; for that purpose initiates an UDP multicasting communication from the server 3, and the transmission off sub-module 901204, then 1dBCP sub-module 901205 and report parameter sub-module 901208 is activated, the protocols to be used and the error control, in the case that errors occur.

The call is received by the API 901 of the server 3 that access the report parameter sub-module 901208 and more precisely the User Authentication and Identification sub-module 9012010 to perform authentication of the user.

Once the user has been authenticated, it accesses the multicast module 9015 and allows the access from the API 901 to the measurement instrument 1.

All the above described process is synchronized by the server control module 301 in the server 3.

Regardless of the API to be in a particular device, the server 3, has the server control module 301 which selects the RF Switching output 31 (see FIG. 8) and synchronously commands the measurement instrument 1 to sweep 32 and take a measurement and trace and provide it to the server 33. Then the server 3 sends multicast information 14 with multiple measurements and traces and it sends it via multicast traffic to the API through satellite hub 11 and satellite modem 10. The server is continuously performing the actions 31, 32, and 33 in all available inputs in the configured frequency, span, amplitude, filters, etc.

Figure 8:
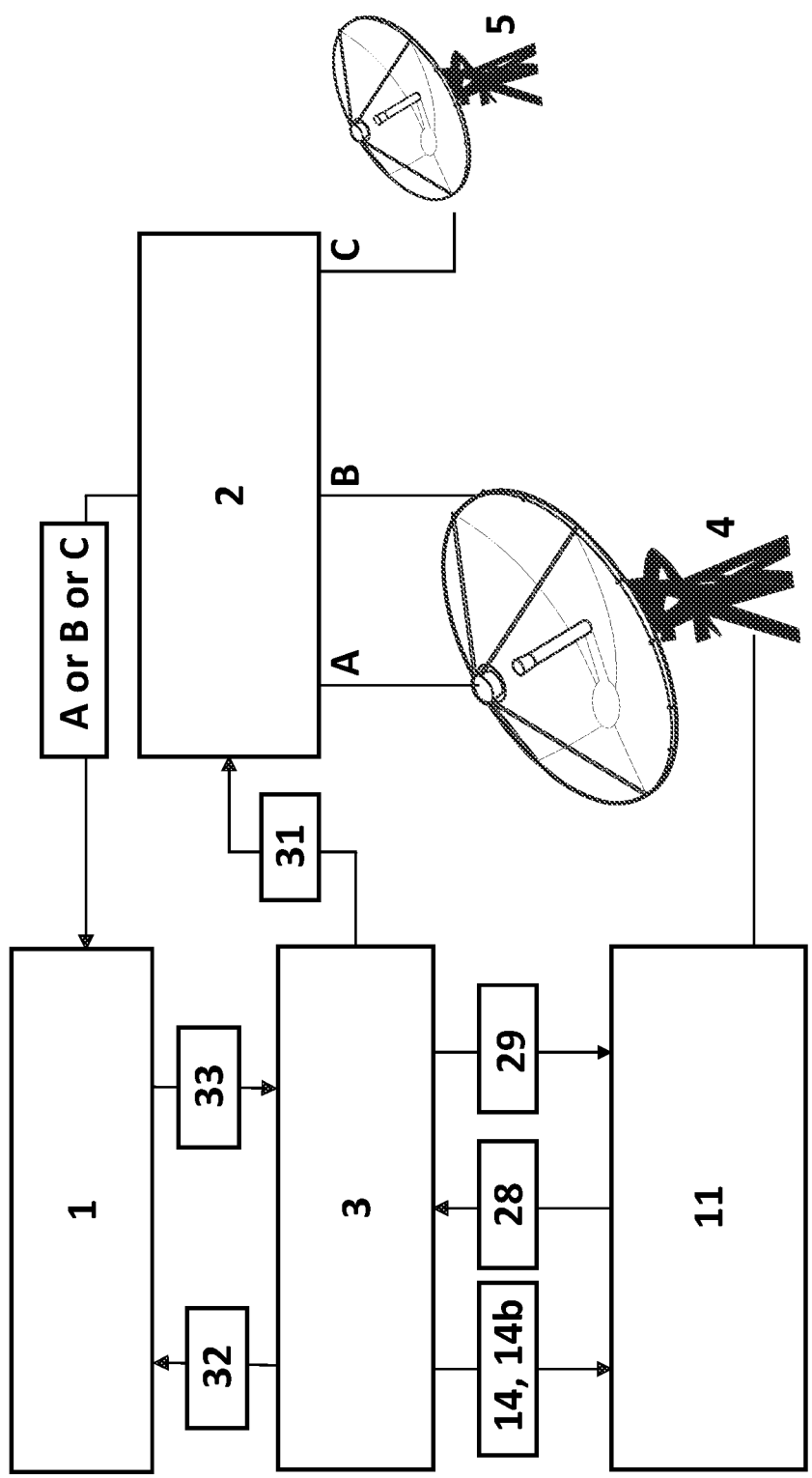
FIG. 8 depicts a diagram of the communications from the satellite hub to the server and measurement instrument and antennas input selection by RF switch.

In FIG. 8, only three inputs have been taken, however, the inputs can be combined to the maximum RF switching matrix capacity with many antennas and satellites.

What is claimed is:

1. A Satellite Auto-Alignment and Commissioning method for Automated Antenna Terminals, comprising:
   receiving a Multicast information at a satellite modem connected to an automated antenna terminal (AAT), the Multicast information being sent from a server in a continuous way;
   sending the Multicast information to an Application Protocol Interface (API) connected to the AAT;
   transmitting a Clean carrier Wave (CW) from the satellite modem via the AAT to the server through a satellite communication in a frequency fixed by the Multicast information having a power at the satellite modem controlled by the API;
   measuring a Signal-to-Noise rate (SNR) of a signal including the Multicast information at the AAT, and extracting, from the Multicast information, a Copol parameter, a Cross-pol parameter and an ASI parameter along with a plurality of thresholds of the SNR, the Copol parameter, the Cross-pol parameter and the ASI parameter;
   stopping the transmission of the CW;
   comparing the measured SNR and the extracted Copol, the extracted Cross-pol and the extracted ASI parameters with the plurality of thresholds;
   if at least one of the SNR, the Copol, the Cross-pol or the ASI parameters does not meet its respective threshold, the API comprises:
      modifying the at least one parameter that does not meet its respective threshold at the AAT controlled by an antenna control unit (ACU);
      repeating until each of the SNR, the COPOL, the Cross-pol and the ASI parameters meet their respective thresholds in which the AAT is correctly aligned and polarized; and,
   calculating a saturation point named the One dB Compression Point and denoted as "1dBCP" at which the power of the satellite modem is maximum without distortion.

2. The method of claim 1, further comprising:
   receiving the CW through at least two antennas with different polarization, at a signal capture element;
   selecting an RF output of the signal capture element connected to a measurement instrument, by switching between the at least two antennas commanded by the server;
   carrying out a sweep and a measure of the SNR, the Copol, the Cross-pol and the ASI parameters of the RF output to form a new multicast information in the measurement instrument;
   sending the new multicast information to the server;
   sending the new multicast information to a hub satellite to be converted into a RF format; and
   multicasting the multicast information.

3. The method of claim 1, further comprising commissioning the AAT with the information provided in the Multicast information and information provided in the API such as a user login and an IP address of the satellite modem.

4. The method of claim 1, further comprising installing the API in the ACU, and connecting the ACU to the AAT and to the satellite modem.

5. The method of claim 1, further comprising installing the API in the satellite modem, and connecting the satellite modem to the AAT and to the ACU.

6. The method of claim 1, further comprising installing the API in a computer, and connecting the computer to the AAT, to the satellite modem and to the ACU.

7. Satellite Auto-Alignment and Commissioning system for Automated Antennas Terminals, wherein the system comprises:
   an automated antenna terminal (AAT);
   a satellite modem connected to the AA, the satellite modem configured to receive a Multicast information, the Multicast information being sent from a server in a continuous way;
   an Application Protocol Interface (API) that is configured to receive the Multicast information from the satellite modem wherein:
   the API is further configured, for the satellite modem, to transmit a Clean carrier Wave (CW) via the AAT to the server through a satellite communication in a frequency fixed by the Multicast information having a power at the satellite modem controlled by the API;
   the API is further configured to measure a Signal-to-Noise rate (SNR) of a signal including the Multicast information at the AAT, and extracting, from the Multicast information, a Copol parameter, a Cross-pol parameter and an ASI parameter along with a plurality of thresholds of the SNR, the Copol parameter, the Cross-pol parameter and the ASI parameter;
   the API is further configured, for the satellite modem, to stop the transmission of the CW;
   the API is further configured to compare the measured SNR and the extracted Copol, the extracted Cross-pol and the extracted ASI parameters with the plurality of thresholds; and,
   if at least one of the SNR, the Copol, the Cross-pol or the ASI parameters does not meet its respective threshold, the API is further configured to modify the at least one parameter that does not meet its respective threshold at the AAT controlled by an antenna control unit (ACU); and the API is further configured to calculate a saturation point named the One dB Compression Point and denoted as "1dBCP" at which the power of the satellite modem is maximum without distortion.

8. The system of claim 7, further comprising:
a signal capture element that is configured to receive the CW through at least two antennas with different polarization;
a measurement instrument connected to an RF output of the signal capture element, the RF output configured to be switched between the at least two antennas commanded by the server,
wherein:
the measurement instrument is further configured to carry out a sweep and a measure of the SNR, the Copol, the Cross-pol and the ASI parameters of the RF output to form the multicast information in the measurement instrument;
the measurement instrument is further configured to send the multicast information to the server;
the server is further configured to send the multicast information to a hub satellite to be converted into the RF format; and
the hub satellite is further configured to multicast the multicast information.

9. The system of claim 8, wherein the server further comprises:
a server control module;
a satellite multicast communication control module, comprising a multitasking sub-module;
a server storage module, comprising:
a user identification and authentication sub-module; and
a measurement system operation save & recall set-up sub-module;
an instrumentation command control module comprising a shared instrumentation coordination sub-module; and
a data base.

10. The system of claim 7, wherein the API further comprises:
a satellite modem command editing and control module;
a command editing and control module, comprising:
a frequency sub-module;
a power sub-module;
a transmit sub-module;
a transmit off sub-module;
a transmit One decibel Compression Point (1dBCP) sub-module;
a display selection sub-module;
a measurement sub-module;
a report parameter sub-module;
a commissioning report sub-module; and
a the User Authentication and Identification sub-module;
a receive only satellite link;
a math processor; and
a multicast module.

11. The system of claim 7, wherein the ACU further comprises:
a connect module;
a measurement trace limit mask sub-module;
an ACU computer interface screen;
a graphics module:
a processing sub-module;
a zoom-in sub-module;
a display; and
an ACU computer non-volatile memory.

* * * * *